| (12) | United States Patent<br>Wang et al. | (10) Patent No.: US 10,164,223 B2<br>(45) Date of Patent: Dec. 25, 2018 |
|---|---|---|

(54) CASE SYSTEM FOR ELECTRIC CELLS WITH HORIZONTALLY-ORIENTED LEAD SHEETS, AND BATTERY AND BATTERY RACK USING THE SAME

(75) Inventors: De Li Wang, Yuhang Town (CN); Jian Chen, Hangzhou (CN)

(73) Assignee: ZHEJIANG NARADA POWER SOURCE CO. LTD., Hangzhou (CN)

( * ) Notice: Subject to any disclaimer, the term of this patent is extended or adjusted under 35 U.S.C. 154(b) by 215 days.

(21) Appl. No.: 14/361,139

(22) PCT Filed: Nov. 28, 2011

(86) PCT No.: PCT/EP2011/071158
§ 371 (c)(1),
(2), (4) Date: May 28, 2014

(87) PCT Pub. No.: WO2013/079085
PCT Pub. Date: Jun. 6, 2013

(65) Prior Publication Data
US 2014/0302368 A1    Oct. 9, 2014

(51) Int. Cl.
*H01M 2/02* (2006.01)
*H01M 2/10* (2006.01)
*H01M 2/30* (2006.01)

(52) U.S. Cl.
CPC ....... *H01M 2/1077* (2013.01); *H01M 2/0242* (2013.01); *H01M 2/305* (2013.01)

(58) Field of Classification Search
CPC .................. H01M 2/0242; H01M 2/1077
USPC .................. 429/99, 149, 156, 158, 160, 179
See application file for complete search history.

(56) References Cited

U.S. PATENT DOCUMENTS

| 6,524,747 B2 * | 2/2003 | Holden ................. H01M 2/127<br>429/176 |
|---|---|---|
| 6,784,636 B1 | 8/2004 | Partington |
| 2002/0061434 A1 * | 5/2002 | Holden ................. H01M 2/127<br>429/54 |

(Continued)

FOREIGN PATENT DOCUMENTS

| CN | 2377686 Y | 5/2000 |
|---|---|---|
| EP | 0 370 534 A2 | 5/1990 |

(Continued)

*Primary Examiner* — Sean P Cullen
(74) *Attorney, Agent, or Firm* — Lucas & Mercanti, LLP; Klaus P. Stoffel

(57) ABSTRACT

A case system for lead batteries is provided. The case system has an essentially six sided cuboid shape with two pairs of parallel sidewalls perpendicular to each other. Each pair of sidewalls defines two opposite surfaces of the essentially cuboid shape and further defines an interior volume inside the case system. The case system includes a further pair of parallel sidewalls, each of them perpendicular to the sidewalls above and each with a surface area larger than that of any one of the surface areas of the above sidewalls. One of the sidewalls is arranged as a separate cover wall for sealing the case system. At least one division plane is further included in the case system. The division plane divides the interior volume, such as to form a plurality of compartments, each for storing an electrical cell. All division planes are perpendicular to the cover wall. Further, an electrical cell, a lead battery and a lead battery layout including the above are shown.

11 Claims, 5 Drawing Sheets

(56) References Cited

U.S. PATENT DOCUMENTS

| | | | | |
|---|---|---|---|---|
| 2005/0058891 A1* | 3/2005 | Marraffa | ............. | H01M 2/1077 429/99 |
| 2005/0084762 A1* | 4/2005 | Vaccaro | ............... | H01M 2/1613 429/302 |
| 2008/0014499 A1 | 1/2008 | Ling | | |
| 2011/0300433 A1* | 12/2011 | Kim | .................... | H01M 2/1022 429/159 |
| 2012/0107674 A1* | 5/2012 | Nishino | ............. | H01M 2/0242 429/163 |
| 2013/0071708 A1* | 3/2013 | Delans | ................ | H01M 2/0242 429/82 |
| 2013/0071723 A1* | 3/2013 | Wertz | .................. | H01M 2/0262 429/163 |

FOREIGN PATENT DOCUMENTS

| | | | | |
|---|---|---|---|---|
| EP | 1 515 379 A2 | 3/2005 | | |
| EP | 2 450 996 A1 | 5/2012 | | |
| JP | WO 2011001581 A1 * | 1/2011 | .......... | H01M 2/0242 |

\* cited by examiner

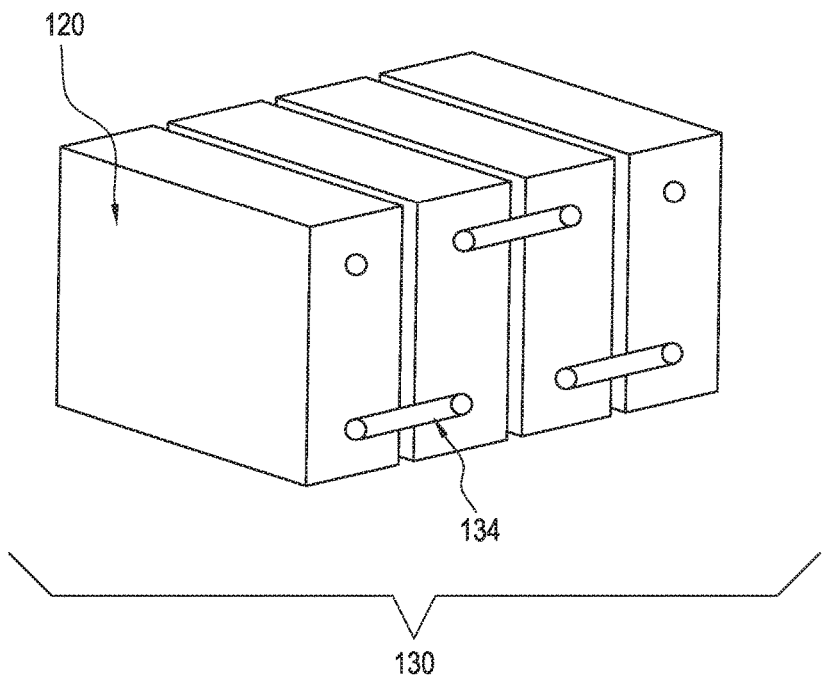
FIG. 5
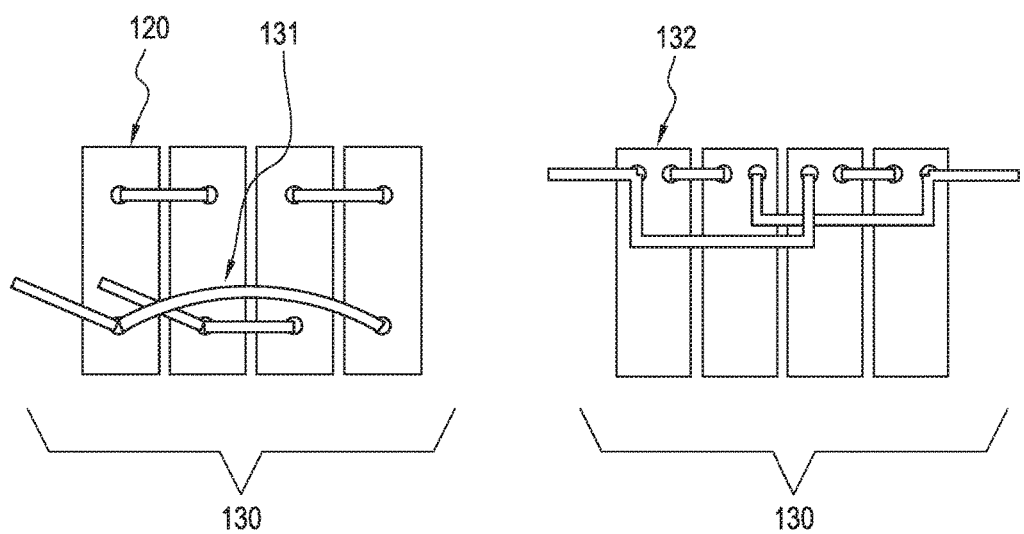
FIG. 6a
FIG. 6b
PRIOR ART

CASE SYSTEM FOR ELECTRIC CELLS WITH HORIZONTALLY-ORIENTED LEAD SHEETS, AND BATTERY AND BATTERY RACK USING THE SAME

CROSS-REFERENCE TO RELATED APPLICATIONS

The present application is a 371 of International application PCT/EP2011/071158, filed Nov. 28, 2011, the priority of this application is hereby claimed and this application is incorporated herein by reference.

BACKGROUND OF THE INVENTION

The present invention relates to a case system for lead batteries, a lead battery, a lead battery rack layout and an electrical cell.

Lead batteries are a common type of battery, where the electrodes are composed of lead sheets with lead or lead dioxide and the electrolyte is formed by sulfuric acid. A lead battery essentially is made up of an acid resistant case and at least two sheets of lead of which one functions as a positive, whereas the other functions as a negative electrode. The sheets are submersed into a sulfuric acid solution.

This most generic type of lead battery is equipped with a gas opening at the top to prevent gas pressure build up. Gas pressure increases, when hydrogen and oxygen are produced through electrolysis.

Understandably such batteries can only be stored and operated in an orientation that ensures that the gas opening is on the top of the case, such as to ensure venting and prevent spilling of the acid. They require refilling with $H_2O$ on a regular basis.

One particular type of lead batteries, so called VRLA type batteries (Valve Regulated Lead Acid Battery) are sealed with a pressure regulating valve and do not require a refilling of water to keep the battery functioning.

Furthermore, such batteries can be designed with absorbent glass mats to have the acid in an absorbed state on glass fibers. These types of lead batteries have significant advantages as they can be operated in any orientation and have a reduced maintenance requirement, i.e. no refilling of $H_2O$ is necessary.

One commonly used battery design is the so-called 19 inch or 23 inch rack system battery, with the battery terminals accessible from the front. Four individual 12V batteries are arranged such as to fit a 19-inch or 23 inch wide and 400 or 600 mm deep drawer of an electrical cabinet or rack. These elements are configured such as to present the terminal accesses at the front side. Cases adapted for racks in the 19 inch/23 inch front access layout have an essentially box shaped case element with 6 compartments. The electrical cells are placed into the compartments, such as to extend too down inwardly into the compartments and to present their individual terminations on the topside.

This configuration has been found to carry a number of disadvantages. For one part, the top down arrangement of the cell leads, due to the large vertical height of the cells, to stratification of the sulfuric acid, which in turn leads to a decrease in capacity and service life of the battery.

One further disadvantage in respect to said setup is a consequence of the 2×3 arrangement of the compartments. It requires comparatively large and thick outside sidewalls of the individual cells so to keep up the compression of the absorbent glass mat between the plates, especially when operating the battery at high temperatures.

A further disadvantage is that the cabling and connection of the individual batteries in a rack is complicated and prone to short circuits.

BRIEF SUMMARY OF THE INVENTION

It was thus an object of the present invention to provide a solution to the problems of the state of the art. It was a particular object of the present invention to provide a case system, a lead battery, battery rack layout and an electrical cell for such a battery that is easy and cheap to produce and has an improved service life and capacity as well as being easier to install compared to the state of the art.

One aspect of the present invention relates to a case system for lead batteries. The case system has an essentially six-sided cuboid shape. The case system comprises two pairs of parallel sidewalls. Both pairs of sidewalls are perpendicular to each other. Together, each pair of sidewalls forms two opposite surfaces of the essentially cuboid shape. An interior volume is defined by these sidewalls inside the case system. The case system further comprises a further pair of parallel sidewalls. These are perpendicular to the sidewalls described above. They furthermore have a surface area larger than that of any one of the surface areas of the sidewalls described above. One of these is arranged as a separate cover wall for sealing the case system. The case system further comprises at least one division plane dividing said interior volume such as to form a plurality of compartments. The compartments are for storing an electrical cell. All the division planes are perpendicular to the cover wall.

An exemplary suitable manufacturing process to produce such a case system would be injection molding. The case system can be integrally formed.

In the context of the present invention, essentially six-sided cuboid shape means that it has a rectangular shape with a height, a length and a depth such as to encompass a volume.

The case system according to the present invention further comprises an access wall part with electrical conductor terminals. The access wall part further comprises at least one fluid channel opening. Preferably it comprises a gas opening. In a preferred embodiment, the access wall part is formed by one sidewall of the six-sided cuboid shape.

The compartments are constructed to hold the electrical cells with the plates in an orientation that is parallel to the surface the case system is placed on when installed on a 482.6 mm (19") or 584.2 mm (23") battery tray.

The case system according to the present invention provides a series of advantages. For instance, having the plates in a horizontal orientation, the path for vertical migration and stratification of the sulfuric acid in the space between the lead sheets of the electrical cell or element is reduced from about 200 mm as in the state of the art for a standard 482.6 mm (19") battery or from 250 mm in a 584.2 mm (23") standard battery to almost negligible 2 mm or less in the present invention.

One further advantage of the present invention is the provision of achieving an increased strength of the outside cell walls. It is known that during operation the absorbent glass mat in the element requires continued compression especially when operating at higher temperatures, the cell case looses strength and dilates and distorts. To ensure compression even at higher operation temperatures, the exterior sidewalls of the compartments, have to be reinforced and thus produced with an increased well thickness. This reduces the volume available for the internal cell parts and strongly increases manufacturing and parts cost.

The case system according to the present invention reduces the overall wall thickness needed to assure cell compression. The walls needed for compression can be comparatively shorter and narrower with the case system according to the present invention, less material can be used for stabilizing the walls between the compartments. This results in a potential increase of compartment volume, where the operative parts, i.e. the plates are stored, as well as to significantly lower material and manufacturing costs.

In a preferred embodiment, the interior volume is divided into six compartments. In a preferred embodiment, the case system is adapted to hold an electrical cell or element in each compartment. Said electrical cell or element is furthermore adapted to be operated in a horizontal orientation.

In a preferred embodiment the case system comprises a one-piece element and the cover wall is a separate ore fabricated element.

In a further preferred embodiment, the cover wall further comprises conductor openings or terminal feedthroughs. In a preferred embodiment, the cover wall according to the present invention further comprises a fluid channel opening. Even more preferred, the cover wall, comprises at least one gas vent with a valve.

In a preferred embodiment, one of the surface areas of the sidewalls has an edge width of approximately 105 mm and an edge depth of approximately 395 mm or 600 mm. In an alternate embodiment, one of the surface areas of the sidewalls has an edge width of approximately 125 mm and an edge depth of approximately 600 mm. None of these surface areas are the surface areas of the sidewall of which one is arranged as a separate cover wall for sealing a case system.

In a preferred embodiment, the compartments are adapted to hold an electrical cell with lead sheet plates. The compartments are further adapted to hold said cells, such that the plates are arranged in a horizontal orientation when the case system rests on a surface with one of its surface are of either approximately 414 $cm^2$ or approximately 620 $cm^2$ or approximately 750 $cm^2$.

In a preferred embodiment, the compartments are adapted to hold an electrical cell with lead sheet plates, such that the plates are arranged in parallel to a surface of the case system with a surface area of approximately 414 $cm^2$, (e.g. 105×395 mm; width×depth) or approximately 630 $cm^2$ (e.g. 105×600 mm; width×depth) or approximately 750 $cm^2$ (e.g. 125×600 mm; width×depth).

In a preferred embodiment, neither the cover wall nor its parallel opposite sidewall has a surface area of approximately 414 $cm^2$ or approximately 630 $cm^2$ or approximately 750 $cm^2$.

In a preferred embodiment, the fluid, respectively preferred gas channel opening comprises at least one gas vent with a valve.

Suitable valves and gas vents for lead batteries with acid electrolyte are discretional for the skilled artisan.

In a further preferred embodiment, the cover wall part is shaped as a cover panel.

In a further preferred embodiment, the cover wall part has a plurality of gas valves. Even more preferably the cover wall part has as many gas valves as the cell housing part has compartments, preferably it has six gas valves. The cover wall part furthermore has a gas-collecting duct.

The injection molding process can be simplified and unwanted mold core movement/deflection during the injection molding, resulting in uneven thickness of the case walls, can be prevented as the mold core is reduced in length from the present of 280 mm to 310 mm to less than 105 mm and 125 mm.

The case system can be sealed with the cover wall part via a hot plate welding technique or by gluing.

Another aspect of the present invention relates to an electrical cell for lead batteries. These electrical cells comprise a plurality of lead sheets arranged in parallel to each other. They further comprise a plurality of absorbent glass fiber mats saturated with an electrolyte. Each glass fiber mat is interposed between two adjacent lead sheets of opposite polarity. The electrical cells are adapted to fit in a compartment of a case system as described above.

The electrolyte is preferably an acid electrolyte.

In a further preferred embodiment, the electrical cell comprises more than 10, and up to 80 lead sheets arranged in parallel to each other. Even more preferably it comprises between 45 and 57 lead sheets.

This construction has the advantage that the cell comes with an increased number of plates which results in an increased redundancy and leads to a decreased loss of battery capacity in case of failure of one or more individual plate.

In a preferred embodiment such plates would be devised to have a length of 105 mm to 125 mm, preferably 60 mm to 80 mm. The width of the plates ranges from 125 mm to 175 mm, preferably 118 mm to 168 mm.

With this layout the number of individual lead sheet plates per cell can be increased by a factor 2.7 to 4.3 over the present design for instance. This increase of plates can reduce the risk that one or more weak or underperforming plates in a cell would impair the performance of a cell significantly and, per consequence, that of the complete battery.

One aspect of the present invention relates to a lead battery. The lead battery comprises a case system as previously described. It is self evident that such a case system can comprise any combination of features described above as preferred embodiments. The case system for a lead battery according to the present invention would at least comprise a one piece, essentially box shaped cell-housing part with at least four sidewalls. The sidewalls enclose an interior volume. The box shaped cell housing or case system has at least one division plane, dividing said interior volume, such as to form a plurality of compartments. Each of the plurality of compartments is adapted for storing an electrical cell or element. The case system further comprises a cover wall part with electrical conductor openings or terminal feedthroughs and at least one fluid channel opening.

The lead battery according to the present invention further comprises at least one electrical cell stored in each compartment. Each electrical cell further comprises a plurality of stacked lead and absorbent glass fiber sheets and an electrolyte. Each electrical cell has a negative (−) termination and a positive (+) termination.

In a preferred embodiment the electrolyte is fixed in a matrix. In an even more preferred embodiment the holding matrix is an absorbent fiber mat or highly dispersed silica, even more preferably a glass fiber mat.

In a preferred embodiment the electrical cells are stored in each compartment alternatingly in respect to the polarity of the cell terminals.

In a preferred embodiment the case system has 6 compartments and each is equipped with an electrical cell or element, such that six electrical cells are in the lead battery.

In a further preferred embodiment the electrical cells are placed in a horizontal, so called "pancake" orientation. In operation the case is placed, such that the plates inside the case extend with the planes of the sheet in a horizontal dimension. The length for stratification of the acid is preferably not more than 3 mm, preferably less. Stratification is limited by the thickness of the absorbent glass fiber sheets.

One further aspect of the present invention is a lead battery layout and associated dimension comprising at least two lead batteries as described above. Said lead batteries can be mounted either in series or in parallel and four units would fit within the 482.6 mm (19") or 584.2 mm (23") wide and 400 mm or 600 mm deep battery tray.

The present invention shall, be further described by means of drawings and specific examples on the following pages. Further advantages and embodiments become evident to a person of ordinary skill in the art by reviewing these. The invention shall not be limited to these examples.

In a preferred embodiment, the lead battery layout makes use or single length battery connectors.

BRIEF DESCRIPTION OF THE DRAWINGS

FIG. 5 is a schematic drawing of a lead battery rack consisting of 4 batteries connected according to the present invention and filling a 482.6 mm (19") or 584.2 mm (23") battery tray.

FIG. 6a is a schematic drawing of a lead battery rack wherefore two time two lead batteries according to the present invention are connected in parallel.

FIG. 6b is a schematic drawing wherefore two times two lead batteries are connected in parallel according to the state of the art.

DETAILED DESCRIPTION OF THE PREFERRED EMBODIMENTS

Figure 1A:
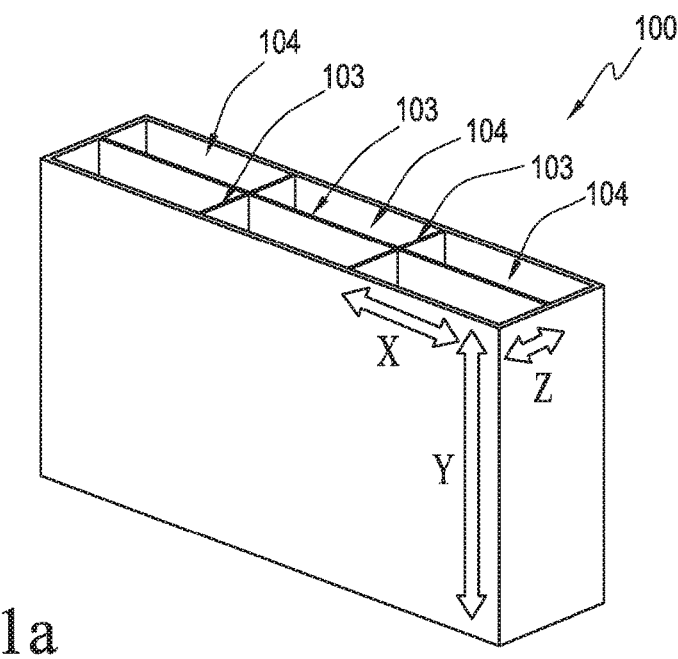
FIG. 1a is a schematic drawing of a compartmentation as in the state of the art.

FIG. 1a shows a compartmentation as used in the state of the art batteries.

The case 100 has six cell compartments in a two times three configuration, meaning that two rows of three compartments are placed in parallel to each other and divided by division planes 103. Each cell compartment 104 has a dimension X, Y and Z. In a typical state of the art battery the dimension Y is 260 mm to 290 mm and the dimension X is 127 to 183 mm.

For ensuring an adequate compression of the absorbent glass mat in the element, during operation, the walls need to be very strong and stable.

Figure 1B:
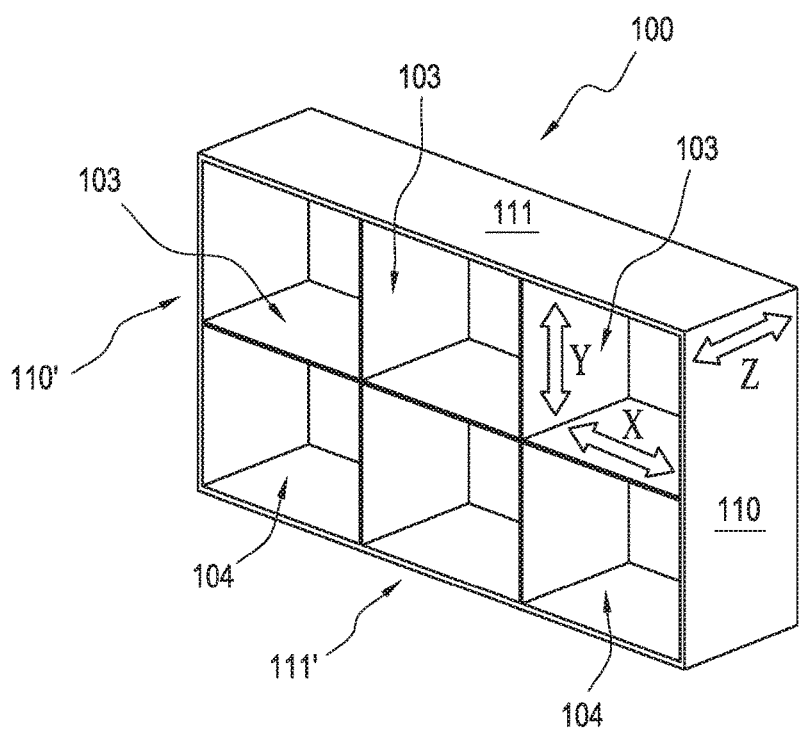
FIG. 1b is a schematic drawing of a compartmentation according to the present invention.

FIG. 1b is a compartmentation according to the present invention. The case 100 has two pairs of parallel sidewalls. The sidewalls 110 and 110' are parallel to each other as well the sidewalls 111 and 111'. The sidewalls 110, 110', 111, 111' define an interior volume inside an essentially cuboid shape. Said interior volume is further subdivided into six compartments 104 by division planes 103.

For ensuring an adequate compression of the absorbent glass mat in the element during operation, only the much smaller exterior wall surfaces, with X×Z dimension, need to be very strong and stable.

Figure 2:
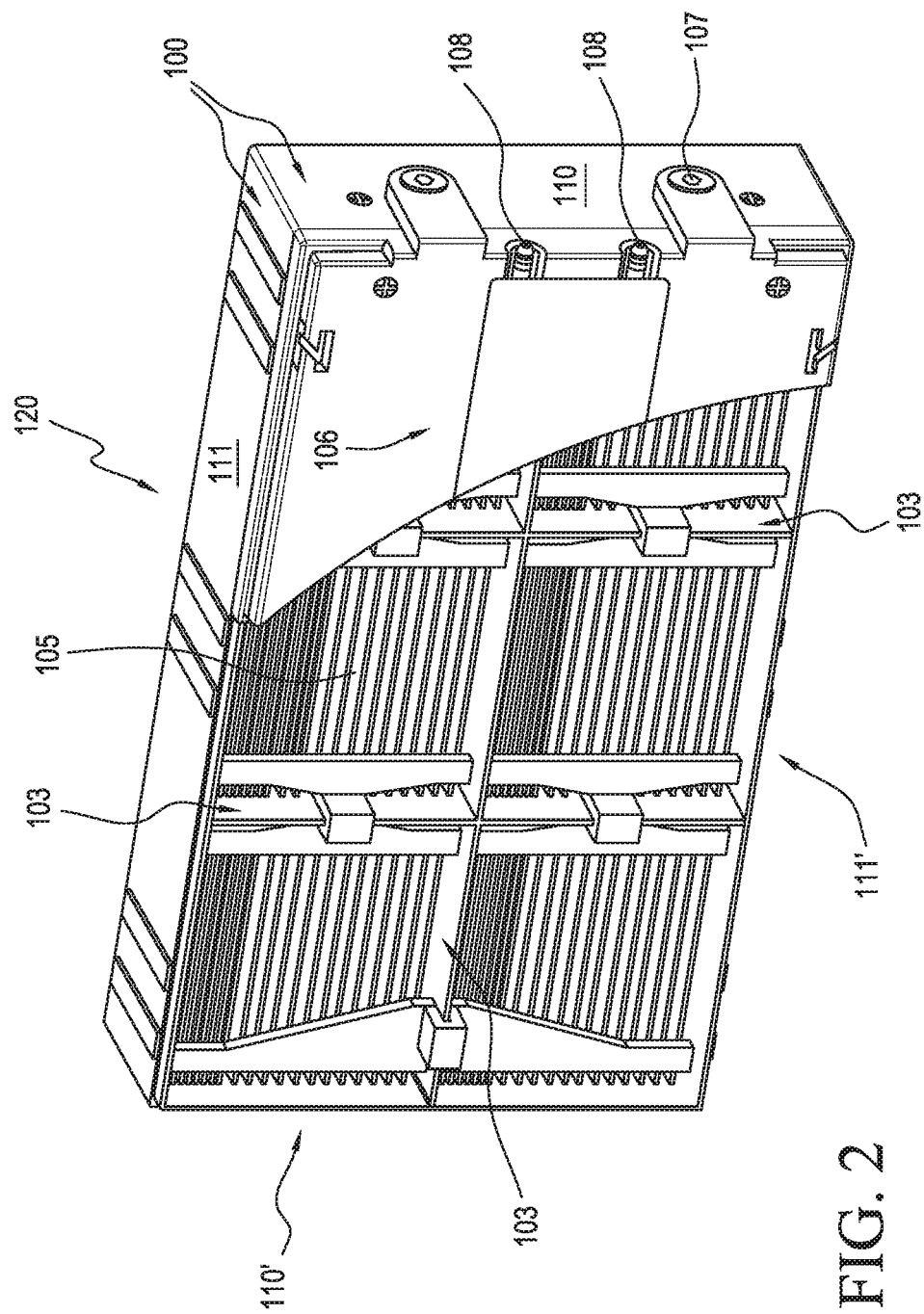
FIG. 2 is a schematic drawing of a battery according to the present invention with a partially removed cover wall.

FIG. 2 shows a battery 120 according to the present invention. The battery is shown with a cut off window for representation purposes. It has an interior volume divided by 3 division planes 103 such as to form six compartments into which an electrical cell or element 105 can be placed. The case 100 is sealed off by a cover wall part 106 with electrical conductor openings or terminal feedthroughs 107 and a fluid, respectively gas nipple 108 for the gas release. The case 100 and the cover wall part 106 can be manufactured of suitable plastic such as SAN, ABS, PC, PP or mixtures thereof, for example.

Figure 3:
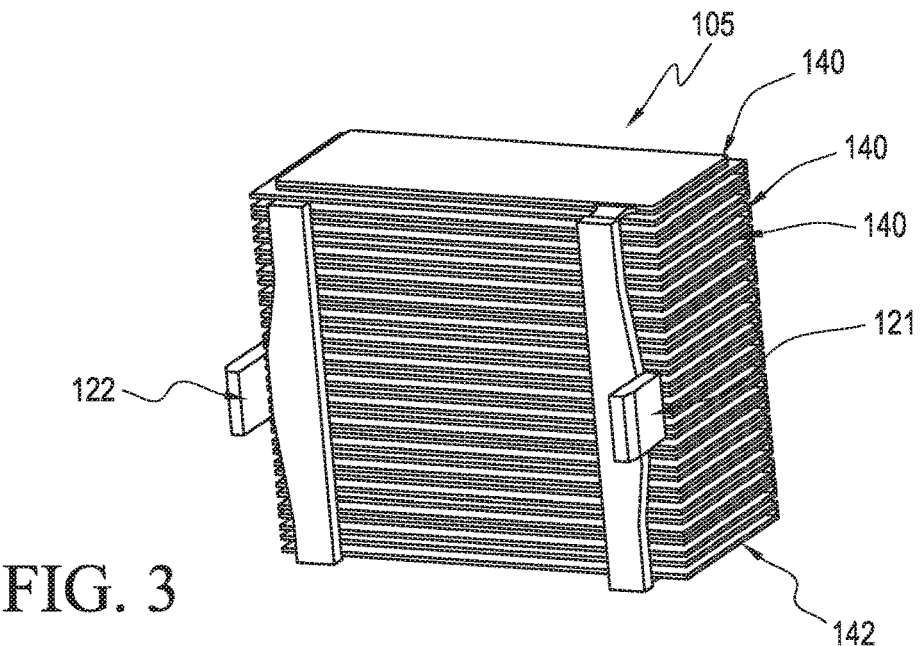
FIG. 3 is a schematic drawing of an electrical cell adapted for use with the present dimension.

FIG. 3 shows an electrical cell 105 as employed in the battery described in FIG. 2.

The electrical cell 105 consists of a plurality of stacked lead sheets 140 separated with absorbent glass fiber mat 142 saturated with electrolyte, whereby the electrolyte in the present electrical cell 105 is sulfuric acid of a concentration of 32% in weight, for example. The number of lead sheets is in this example 35. The cell has a positive termination 122 and a respective negative termination 121.

Figure 4:
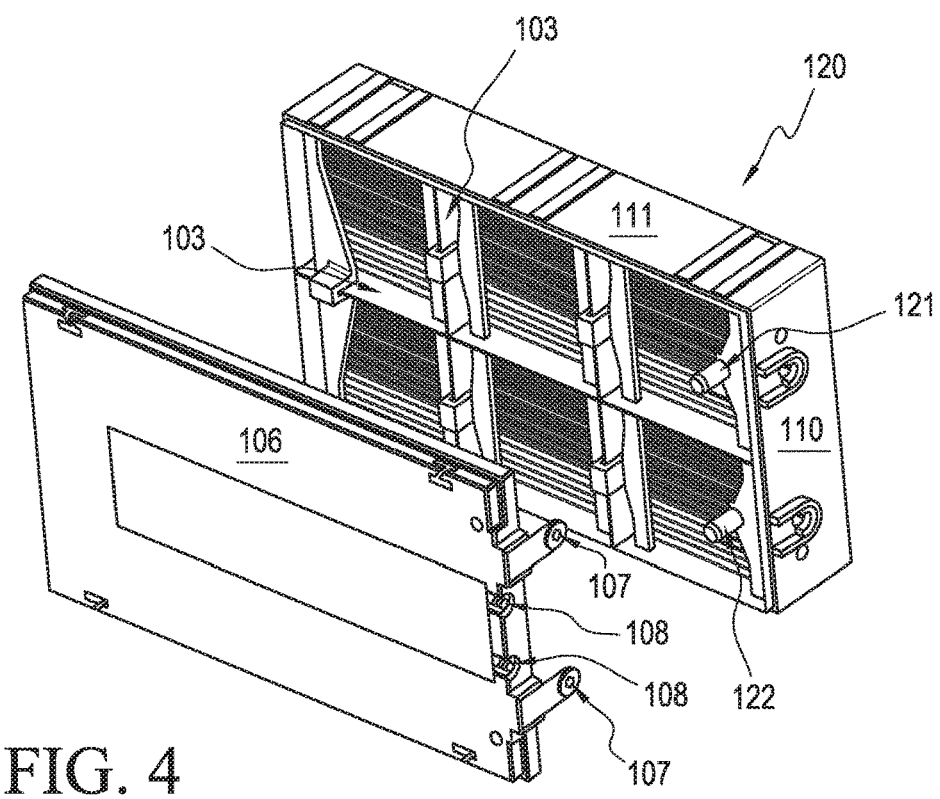
FIG. 4 is a schematic drawing of a battery according to the present invention with an exploded cover wall view.

FIG. 4 shows a lead battery according to the present invention with the cover wall part 106 exploded. The cover wall part 106 has electrical conductor openings or terminal feedthroughs 107 through which adequate electrical contact can be made to the positive cell termination 122, or the negative terminations 121 respectively.

The cover wall part 106 further has six gas pressure regulation valves and at least one central gas collection duct (not shown) on the back side (the part facing the electrical cells when mounted) terminating with at least one nipple 108 on the scene side the terminal feedthroughs 107 are located on the cover wall part 106.

FIG. 5 shows a battery rack 130 consisting of four lead batteries 120 of a valve regulated lead absorbent class mat type, configured according to the present invention. The setup of the front access terminals enables connecting the four batteries 120 by means of an easy to use low cost, low profile, rigid, and insulated battery connector 134 made from copper.

FIG. 6a shows how a series of four batteries 120 according to the present invention can be connected in parallel. Four 12V batteries according to the present invention can be linked in parallel with a simple flexible cable connectors 131.

By means of comparison, an equally parallel linked rack 130 of four batteries 132 of the state of the art is shown in FIG. 6b. The batteries cannot be linked without having to use special shaped solid and rigid connectors.

By this means, a safer, cheaper and easier way of connecting four 12V batteries to a 2×24V chain in parallel is provided.

Figure 7A:
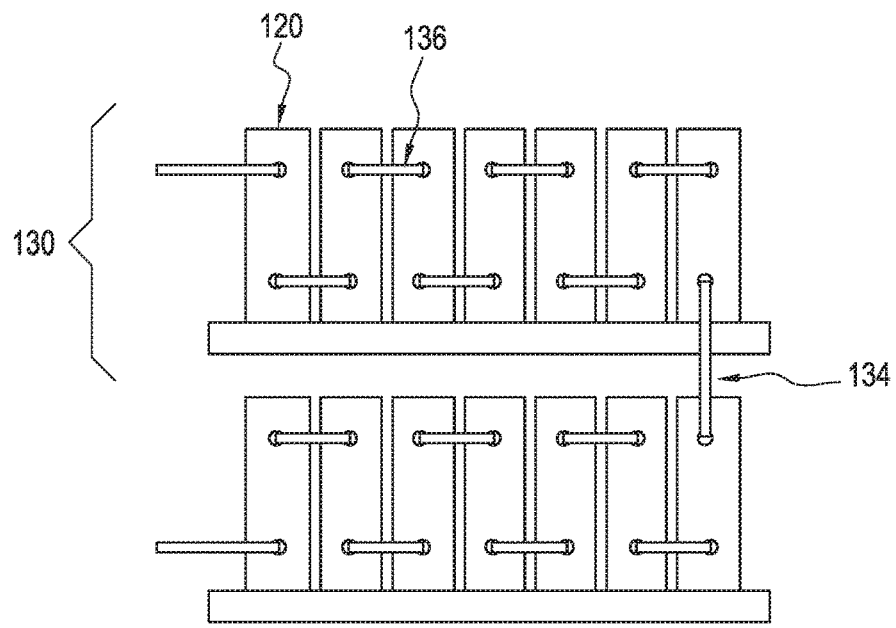
FIG. 7a shows a schematic drawing of a two-level rack of batteries according to the present invention.

FIG. 7a shows two racks 130 equipped each with 7 lead batteries 120 according to the present invention.

The figure shows how easy it is to connect the batteries 120 by means of the battery connectors 134 and 135 with the front terminal layout according to the present invention.

Figure 7B:
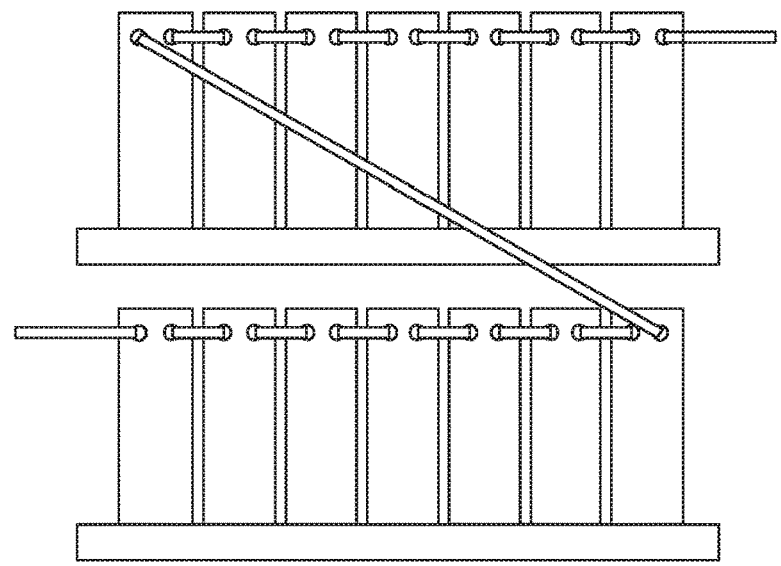
FIG. 7b shows a two-level rack of lead batteries that are connected as in the state of the art.

For comparison, FIG. 7b shows a configuration of two racks with each 7 batteries connected as required in the state of the art. The intertier connection of the state of the art batteries requires a long cable and is associated with danger of short circuits due to the proximity of the intercell connector position with the metallic rack.

The invention claimed is:

1. A battery rack, comprising a plurality of lead batteries, each lead battery comprising:
   a case system having an essentially six-sided cuboid shape, comprising:
      a first pair of parallel, vertical sidewalls and a second pair of parallel, horizontal sidewalls perpendicular to the first pair of parallel sidewalls, and each of the first pair of sidewalls and the second pair of sidewalls defining two opposite surfaces of the essentially cuboid shape and further defining an interior volume inside the case system;
      a third pair of parallel sidewalls, each of the third pair of parallel sidewalls being perpendicular to the first pair of parallel sidewalls and the second pair of parallel sidewalls, each of the third pair of sidewalls having a surface area larger than any one of the surface areas of the first pair of parallel sidewalls and the second pair of parallel sidewalls, one of the third pair of sidewalls being arranged as a separate cover wall for sealing the case system;
      three division planes, dividing said interior volume such as to form six compartments, an electrical cell being storable in each of the compartments, all of the division planes being perpendicular to the cover wall,
      each of the compartments being configured so that the electrical cell with lead sheets is holdable such that the lead sheets are arranged in a horizontal orientation parallel to the second pair of parallel sidewalls; and
   at least one electrical cell in each compartment, the at least one electrical cell comprising:
      a plurality of lead sheets arranged parallel to each other;
      a plurality of absorbent glass fiber mats saturated with an electrolyte, each glass fiber mat being interposed between two adjacent ones of the lead sheets;
      the electrical cell is arranged in a compartment of the case system such that the lead sheets are arranged in the horizontal orientation;
   wherein the lead batteries are arranged on a 482.6 mm or 584.2 mm wide and 400 mm or 600 mm deep battery tray;
   wherein each of the batteries comprises terminals and all the terminals face the same side and are connected by battery connectors;
   wherein the terminals are arranged along a vertical line substantially at a center in a horizontal direction of one of the sidewalls of the first pair of parallel, vertical sidewalls; and
   wherein the terminals are connected by single length battery connectors.

2. The battery rack according to claim 1, further comprising at least one fluid channel opening having a gas vent with a valve.

3. The battery rack according to claim 1, wherein the case system is a single-piece element, apart from the cover wall which is a separate, prefabricated element.

4. The battery rack according to claim 1, wherein the cover wall further comprises conductor openings or terminal feedthroughs.

5. The battery rack according to claim 1, wherein one of the surface areas of the first pair of parallel sidewalls and the second pair of parallel sidewalls has one of:
   an edge width of approximately 105 mm and an edge length of approximately 395 mm,
   an edge width of approximately 125 mm and an edge length of approximately 600 mm, or
   an edge width of approximately 105 mm and an edge length of approximately 600 mm.

6. The battery rack according to claim 1, wherein the compartments are oriented so that the electrical cell is held such that the lead sheets are arranged in the horizontal orientation when the case system rests on a surface with a surface area of approximately one of:
   414 $cm^2$;
   630 $cm^2$; or
   750 $cm^2$.

7. The battery rack according to claim 1, wherein the compartments are oriented so that the electrical cell is held such that the lead sheets are arranged in parallel to a surface with a surface area of approximately one of:
   414 $cm^2$;
   630 $cm^2$; or
   750 $cm^2$.

8. The battery rack according to claim 1, wherein one of the surface areas of the first pair of parallel sidewalls and the second pair of parallel sidewalls has a surface area of approximately one of:
   414 $cm^2$;
   630 $cm^2$; or
   750 $cm^2$.

9. The battery rack according to claim 1, wherein the plurality of lead batteries includes four batteries.

10. The battery rack according to claim 1, wherein the plurality of lead sheets includes more than ten and up to eighty lead sheets arranged in parallel to each other.

11. The battery rack according to claim 10, wherein the plurality of lead sheets includes 45 to 57 lead sheets.

* * * * *